United States Patent [19]
Peyton et al.

[11] 3,780,615
[45] Dec. 25, 1973

[54] PRESSURE ACTIVATED HEAT ABSORBING OR EMITTING DETECTION SYSTEM

[76] Inventors: Keith S. Peyton, c/o Hq. SAMSO (SMTAX), AFUPO, Los Angeles, Calif. 90045; Michael D. Jolly, Lexington Ave., Highland Mills, N.Y. 10930

[22] Filed: Jan. 6, 1969

[21] Appl. No.: 790,513

[52] U.S. Cl............................ 89/1 A, 102/8, 250/342
[51] Int. Cl............................... G01j 3/00, G01j 5/00
[58] Field of Search ................ 250/71, 342; 102/37, 102/8; 89/1 A

[56] References Cited
UNITED STATES PATENTS

| | | | |
|---|---|---|---|
| 679,661 | 7/1901 | Wythe | 102/37 |
| 2,412,165 | 12/1946 | McDermott | 250/83.3 |

*Primary Examiner*—Malcolm F. Hubler
*Attorney*—Harry A. Herbert, Jr. and Alvin B. Peterson

[57] ABSTRACT

A detector for use in warfare, to provide intelligence information concerning the use of roads or trails by the enemy. The detector comprises an agglomeration of crushable capsules containing reactants for producing a temperature change when the capsules are crushed. The agglomerations are distributed over roads and trails to be monitored and may contain either a chemical which will react with a component of the atmosphere or two chemicals which will react with each other when the agglomerations are crushed. In either case, the reaction produces a change in temperature and a corresponding change in infrared radiation which is detectable by an overflying aircraft carrying suitable infrared detection equipment.

4 Claims, 3 Drawing Figures

PATENTED DEC 25 1973　　　　　　　　　　　　　　3,780,615

INVENTORS
KEITH S PEYTON
MICHAEL D. JOLLY
BY
Harry A. Herbert Jr
ATTORNEY

PRESSURE ACTIVATED HEAT ABSORBING OR EMITTING DETECTION SYSTEM

BACKGROUND OF THE INVENTION

1. Field of the Invention

This invention is in the field of Military Intelligence Operations. More specifically, this invention is in the field of troop and vehicular movement detection.

2. Description of the Prior Art

Minute agglomerations of small individual capsules are known in the art. Endothermic and exothermic chemical reactions are also known. However, the distribution of such agglomerations over roads and trails for the purpose set forth in this specification has not been disclosed by the prior art to the inventors' knowledge.

The detection of unfriendly troop movements and supply lines is an important facet of any military operation, but it assumes a strategic role in limited warfare, where, in addition to defeating the enemy, one of the major objectives is that of finding and identifying them. Although advanced reconnaissance aircraft and sophisticated detection equipment and methods have been developed, camouflaged troops and equipment often go undetected in remote areas even though periodic reconnaissance missions are conducted.

Aircraft and photographic equipment are available which can provide an accurate infrared pictorial spectrum of the terrain covered during a reconnaissance mission. Advances in technology have made available an infrared photographic device which is capable of detecting thermal radiation differentials of 0.5° F. This photographic device is known to those skilled in the reconnaissance art and can be used in practicing this invention.

SUMMARY OF THE INVENTION

The first step of this invention is the preparation of agglomerations containing a plurality of small capsules. The small capsules are filled with chemical materials which undergo exothermic or endothermic reactions when ruptured by pressure from vehicle tires or human feet causing a change in the infra-red radiation pattern. Encapsulation may be accomplished by a variety of prior art methods. For example, U. S. Pat. Nos. 3,155,590 and 3,161,602 diclose methods suitable for the formation of the agglomerations of this invention.

The system may be a one component system or a two component system. An example of material suitable for a one component system is $CaH_2$. If capsules containing calcium hydride are ruptured, the calcium hydride reacts with atmospheric moisture to produce an exotherm. In a two component system a metal such as aluminum may be placed in approximately half of the smaller capsules of an agglomeration and a base such as sodium hydroxide or potassium hydroxide in the other half. When adjacent capsules are ruptured, the base reacts with the metal producing an exotherm. The agglomerations, after their preparation, may be camouflaged with paint. The color of the paint selected depends upon the terrain whereby they are to be used and may be readily ascertained by one skilled in the art of camouflaging.

After camouflaging, the agglomerations are scattered over a trail or road to be observed. They may be distributed either by mechanical or manual means.

After distribution, periodic reconnaissance flights are made over the area of distribution with aircraft fitted with infrared detection equipment such as an infrared camera. If troops or vehicles have passed over and ruptured the capsules, their passing can be detected after the troops or vehicles are no longer present.

DESCRIPTION OF THE PREFERRED EMBODIMENT

Figure 1:
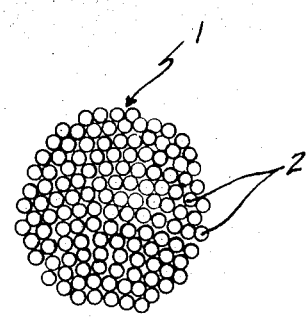
FIG. 1 represents an agglomeration of small capsules containing a chemical reactant which will react with a component of the atmosphere to produce a temperature change when the agglomeration is crushed.

The preferred embodiment of this invention can best be understood by referring to the drawing.

FIG. 1 shows a plurality of small capsules 2 bound together by a suitable binder into an agglomeration 1. There are many suitable binders well known in the art. FIG. 1 represents a one component system. That is, the small capsules 2 have encapsulated within them one chemical component. The chemical component may be any compound or element which will react with a component of the atmosphere to produce a temperature change when a capsule containing it is ruptured. One suiable component is $CaH_2$.

Figure 2:
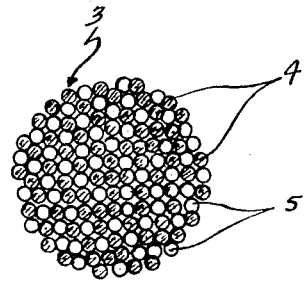
FIG. 2 represents an agglomeration of small capsules containing two chemical reactants which will react with each other to produce a temperature change when the agglomeration is crushed.

FIG. 2 shows a plurality of small capsules 4 and 5 bound together into an agglomeration 3 and represents a two component system. The two components may be any two chemical reagents which will react with each other to produce a temperature change when they are brought together by the rupture of their respective capsules. Suitable reactants for a two component system are Al and NaOH. Approximately half of the capsules of an agglomeration are filled with one component and the other half are filled with the other component.

Figure 3:
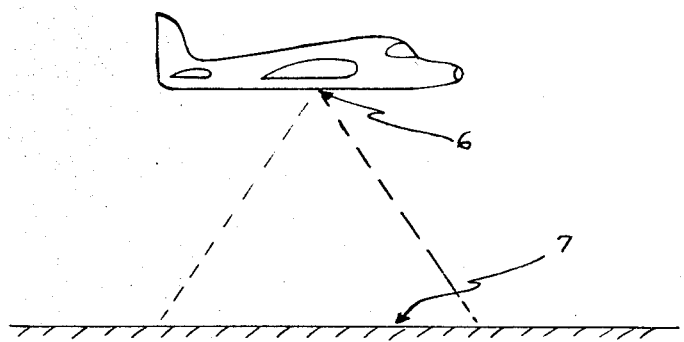
FIG. 3 represents an aircraft equipped with an infrared aerial camera flying over an area which has been covered with the agglomerations of this invention.

FIG. 3 shows an aircraft 6 equipped with an infrared aerial camera flying over a section of terrain 7 which has had agglomerations of either FIG. 1 or FIG. 2 scattered over it. If troops or vehicles have passed over the terrain 7 and crushed some of the agglomerations causing temperature changes, the infrared equipment will be able to detect their passing even though the passing has taken place several hours prior to the overflight.

The agglomerations of FIGS. 1 and 2 may be camouflaged and made to appear like dirt clods or twigs or any other suitable item, depending upon the terrain to be observed, by anyone skilled in the art of camouflaging. Thus, the agglomerations may be scattered in any suitable location and remain undetected by enemy troops passing over them.

Any chemical material which will react with a component of the atmosphere to give an exothermic or endothermic reaction upon exposure to the atmosphere may be used in a one component system. Examples of suitable materials are $CaH_2$, $LiAlH_4$, and the like.

Any two chemical components which will react with each other endothermically or exothermically are suitable for a two component agglomeration. Examples of suitable materials are $H_2SO_4/Al$, $HCl/Al$, $NaOH/Al$, $KOH/Al$, and the like.

It should be emphasized again that this invention permits the detection of enemy troop or vehiclular movement after the troop or vehicular movement has taken place. The lingering small temperature change produced in the surrounding atmosphere by crushing and resulting chemical reaction permits this. Thus, this invention makes it possible to detect the presence of troops in an area without actually seeing the troops.

We claim:

1. The method of covert aerial detection of the movement of relatively heavy objects such as troops or vehicles over an area, comprising the steps of: distributing over the area small camouflaged agglomerations of a large number of pressure frangible capsules containing a chemical reactant capable of reacting exothermally or endothermally with a component of the atmosphere; and later photographing the area with an airborne infrared sensitive camera.

2. The method of covert aerial detection of the movement of relatively heavy objects such as troops or vehicles over an area, comprising the steps of: distributing over the area small camouflaged agglomerations of a large number of uniformly intermixed discrete quantities of the individual reactants of a two-reactant exothermic or endothermic chemical reaction, the quantities of at least one of the reactants being contained in capsules that rupture under pressure; and later photographing the area with an airborne infrared sensitive camera.

3. A pressure activated temperature changing granular material to be spread over the ground to permit the covert aerial infrared detection of troop and vehicle movements in which each grain is a camouflaged agglomeration of a large number of pressure frangible capsules containing a chemical reactant capable of reacting exothermally or endothermally with a component of the atmosphere.

4. A pressure activated temperature changing granular material to be spread over the ground to permit the covert aerial infrared detection of troop and vehicle movements in which each grain is a camouflaged agglomeration of a large number of uniformly intermixed discrete quantites of the individual reactants of a two-reactant exothermic or endothermic chemical reaction, the quantities of at least one of the reactants being contained in capsules that rupture under pressure.

* * * * *